United States Patent [19]

Iizawa

[11] Patent Number: 5,821,985
[45] Date of Patent: Oct. 13, 1998

[54] MULTI-POINT VIDEOCONFERENCE SYSTEM HAVING A FIXED CONTROL STATION FOR DATA TRANSFER

[75] Inventor: Junichi Iizawa, Tokyo, Japan

[73] Assignee: NEC Corporation, Tokyo, Japan

[21] Appl. No.: 948,488

[22] Filed: Oct. 10, 1997

Related U.S. Application Data

[63] Continuation of Ser. No. 720,568, Oct. 2, 1996, abandoned, which is a continuation of Ser. No. 395,880, Feb. 28, 1995, abandoned.

[51] Int. Cl.[6] .......................... H04M 11/00; H04N 7/15
[52] U.S. Cl. ............................ 348/15; 348/16; 370/260; 370/265; 379/93.21
[58] Field of Search ................. 348/14–20; 379/93.01, 379/93.14, 93.17, 93.21, 93.28, 202–207; 370/260, 265

[56] References Cited

U.S. PATENT DOCUMENTS 5,003,532  3/1991  Ashida et al. ........................ 348/15
5,446,491  8/1995  Shibata et al. ....................... 348/15
5,473,363  12/1995  Ng et al. .............................. 348/15

FOREIGN PATENT DOCUMENTS 2-73758  3/1990  Japan .

Primary Examiner—Wing F. Chan
Attorney, Agent, or Firm—Ostrolenk, Faber, Gerb & Soffen, LLP

[57] ABSTRACT

A plurality of local stations each respectively have terminal equipment for coding in a compressing manner and multiplexing audio data, video data and cnotrol data of the local station to obtain a first multiplex data, and demultiplexing and decoding in a decompressing manner a second multiplex data input thereto from a control station connected by a communication line to the local station. The control station has a multi-point videoconference controller for responding to the control data in the first multiplex data from any local station to process the first multiplex data from a selected station, to generate the second multiplex data to be transmitted to each of other local stations than the selected station. The second multiplex data to the other local stations includes the audio data and the video data in the first multiplex data from the selected station.

13 Claims, 5 Drawing Sheets

MULTI-POINT VIDEOCONFERENCE SYSTEM HAVING A FIXED CONTROL STATION FOR DATA TRANSFER

This is a Continuation of Application Ser. No. 08/720,568 filed on Oct. 2, 1996, now abandoned, which is a Continuation of Application Ser. No. 08/395,880 filed on Feb. 28, 1995, now abandoned.

BACKGROUND OF THE INVENTION

The present invention relates to a videoconference system, and particularly to a multi-point videoconference system having a plurality of videoconference stations located at multiple sites and networked under control of a multi-point videoconference controller so that a combination of audio data and video data can be broadcasted from one station to the other stations.

Description of the Related Art

FIG. 1 shows a multi-point videoconference system based on a disclosed system in the Japanese Patent Lay-Open Publication No. 2-73758.

The shown system in FIG. 1 has a plurality of videoconference stations 300-1 to 300-N located at multiple remote sites in a country and networked under control of a videoconference managing master controller 400. Each station is communicatable through a pair of assigned channels 100 of a communication satelite 200 for transmission of audio data and video data, and a private line 120 for transmission of control data and additional data. The audio and video data can be broadcasted from one station 300-1 to the other stations 300-2 to 300-N.

At the station 300-1, audible sounds from and images of an object or person therein are collected or caught by a microphone 314 and a camera 312, respectively, where they are converted to signals to be input to an audio/video signal switching device 310. Selected signals received by the device 310, audio or video, are respectively coded at a coder/decoder 330, where coded data are time-division multiplexed. Then, resultant multiplex data therefrom are modulated at a modulator/demodulator 340 and transmitted from an antenna 360 of the station 300-1 to the satelite 200, to be broadcasted therefrom to the other stations 300-2 to 300-N.

At each of these stations 300-2 to 300-N, an antenna 360 thereof receives the broadcasted data. The received data are demodulated at a modulator/demodulator 340 and demultiplexed to be decoded at a coder/decoder 310, wherefrom separated audio and video signals are input to an audio/video signal switching device 310, where they are selected to be announced from a speaker 318 or displayed on a monitor 316.

Any station 300-1 to 300-N is provided with a subcontroller 350 connected on the one hand through the control line 120 to the master controller 400 and on the other hand to the coder/decoder 330 and the modulator/demodula tor 340. The subcontroller 350 has an operation panel 320 connected thereto and to the audio/video signal switching device 310. The operation panel 320 is available for a person in the station to issue a request or permission of voice.

At any of the stations 300-2 to 300-N, if one operates the panel 320 for an intended voice, an issued request for voice from the subcontroller 350 of that station is sent via the control line 120 to the master controller 400, which repeats it. Then, the request is transmitted through the control line 120 to the station 300-1, and input to the subcontroller 350 therein, where it is processed to be displayed on the panel 320, to thereby annunciate a person in the station 300-1.

At the station 300-1, which may receive a plurality of concurrent requests, one can select one of them by operating the panel 320 to issue a permission of voice signal from the subcontroller 350 to a corresponding one of the stations 300-2 to 300-N.

The permission is then sent via the master controller 400 to the corresponding station, and input to the subcontroller 350 therein, where it is processed to control the modulator/demodulator 340 to have a satelite carrier assigned to this station, allowing anyone therein to speak to the station 300-1.

In conventional multi-point videoconference systems of an exemplified type in FIG. 1, a plurality of remote stations are each respectively connected to a broadcasting station, by means of high bit-rate channels such as communication satelite channels for transmitting a combination of audio data and wide-band video data of an object or person in this station to those stations or vice versa. And besides, an additional line such as a private line having a limited bit rate is provided for transmission of control data such as on request for voice or inquiries from a person in each of the former stations to the latter station.

The conventional systems therefore need adapted stations with exclusive equipment such as for satelite communications so that they are large scaled, thus being inadvantageously restricted in number and site selection for installation.

Moreover, the necessary use of expensive communication channels such as satelite channels results in a significant cost.

SUMMARY OF THE INVENTION

The present invention has been achieved with the foreoging points in mind.

It is therefore an object of the present invention to provide a multi-point videoconference system and a multi-point videoconference method each permitting a combination of audio and video data to be transmitted with a reduced cost, among multiple local stations including a broadcasting one.

To achieve the object, a genus of the present invention provides a multi-point videoconference system in which a plurality of local stations each repsectively have their own data consisting of audio data, video data and control data.

The multi-point videoconference system comprises the local stations and a control station connected to each local station by an associated communication line.

The local stations each respectively have terminal equipment for coding in a compressing manner and multiplexing their own data input thereto from peripheral equipment thereof to obtain a set of multiplex data (herebelow called "a first multiplex data") to be output therefrom to the communication line, and demultiplexing and decoding in a decompressing manner another set of multiplex data (herebelow called "a second multiplex data") input thereto from the communication line to obtain reproduced data to be output therefrom to the peripheral equipment.

Each communication line transmits the first multiplex data output from the terminal equipment of an associated local station to the control station, and the second multiplex data to be input from the control station to the terminal equipment of the associated station.

The control station has a multi-point videoconference controller for responding to the control data in the first multiplex data transmitted thereto through the communication line from any local station, to process the first multiplex data from a selected local station to generate the second multiplex data to be transmitted through the communication line to each of the local stations other than the selected station, so that this multiplex data includes the audio data and the video data of the selected station, as they are coded in the compressing manner and multiplexed. The second multiplex data to the selected station is kept alive in a nullified state.

According to the genus of the invention, the data of each local station that include wide-band video data are compressedly coded and multiplexed to be transmitted as a first multiplex data through an associated communication line, without the need of using a high bit-rate channel such as a satelite communication channel. Among a plurality of local stations, a selected one has a combination of audio data and video data in the first multiplexed data thereof processed to generate a second multiplex data to be transmitted through the communication line to each of the other local stations, where it is reproduced, so that the audio data and the video data of the selected station is broadcasted to the other local stations. The manner of selecting a local station is arbitrary, it may be programmed in a multi-point, videoconference controller, for example.

According to a species of the genus of the invention, the peripheral equipment of each of at least local stations other than the selected station is operable to mix a request for voice in the control data of that station, and the multi-point videoconference controller is responsive to the request from an arbitrary one of the local stations other than the selected station to process the first multiplex data of that station to generate the second multiplex data to the selected station so that this multiplex data includes the request for voice from the arbitrary local station.

According to this species of the invention, a request for voice issued from an arbitrary local station other than a selected local station is transmitted to the selected station.

According to another species of the genus of the invention, the peripheral equipment of at least the selected station is operable to mix in the control data of that station a permission of voice to at least one of the other local stations, and the multi-point videoconference controller is responsive to the permission from the selected station to process the first multiplex data of the selected station and that of each associated local station to the permission, to generate the second multiplex data to each associated station with the permission and at least the audio data of each of other associated stations, if any, contained therein in addition to the audio data and the video data of the selected station, that to the selected station with at least the audio data of each associated station contained therein, and that to each of the stations other than the selected station and the associated stations with at least the audio data of each associated station contained therein in addition to the audio data and the video data of the selected station.

According to this species of the invention, a permission of voice issued from a selected local station is transmitted to each associated local station to the permission, and at least audio data of each associated station are broadcasted to other local stations than that station, whereas video of that station may also be broadcasted, in addition to that a combination of audio data and video data of the selected station is kept broadcast to local stations other than this station.

According to still another species of the genus of the invention, the multi-point videoconference controller is responsive to an addition instruction contained in the first multiplex data of the selected station to process the first multiplex data of a designated local station by the instruction, to generate the second multiplex data to each of the local stations other than the designated station with a combination of the audio data and the video data of this station additionally contained therein.

According to this species of the invention, from among a plurality of local stations, an additionally selected one besides an initially selected one has a combination of audio data and video data in first multiplex data thereof additionally broadcast, so that it is transmitted alone to the initially selected station and in combination with the audio and video data of the initially selected station to each of the local stations other than the initially and additionally selected local stations.

According to yet another species of the genus of the invention, the second multiplex data further includes part of the control data from the selected local station.

Moreover, to achieve the object described, another genus of the present invention provides a multi-point videoconference method for a system that includes a plurality of local stations each having their own data consisting of audio data, video data and control data. The multi-point videoconference method comprises five steps.

A first step codes in a compressing manner and multiplexes the own data to obtain a first multiplex data at each local station.

A second step transmits the first multiplex data of each local station through a communication line connecting that local station to a control station.

A third step responds to the control data in the first multiplex data transmitted through the communication line to the control station from any local station, to process the first multiplex data from a selected local station to generate a second multiplex data including a combination of the audio data and the video data of the selected station.

A fourth step transmits the second multiplex data through the communication line to each of local stations other than the selected station.

Then, a fifth step demultiplexes and decodes in a decompressing manner the second multiplex data to obtain reproduced data at each of the other local stations.

According to either genus of the invention, a multi-point videoconference system including a plurality of local stations each having terminal equipment with a number of implementable functions by compact digital devices is permitted to broadcast a combination of audio data and video data from a selected local station to the other local stations, without the need of using a high bit-rate communication channel such as a satelite communication channel and hence with a reduced cost and an increased flexibility in selection of installation site.

BRIEF DESCRIPTION OF THE DRAWINGS

The objects, features and advantages of the present invention will become more apparent from consideration of the following detailed description, taken in conjunction with the accompanying drawings, in which.

DESCRIPTION OF THE PREFERRED EMBODIMENTS

There will be detailed below preferred embodiments of the present invention, with reference to FIGS. 2 to 5.

Figure 1:
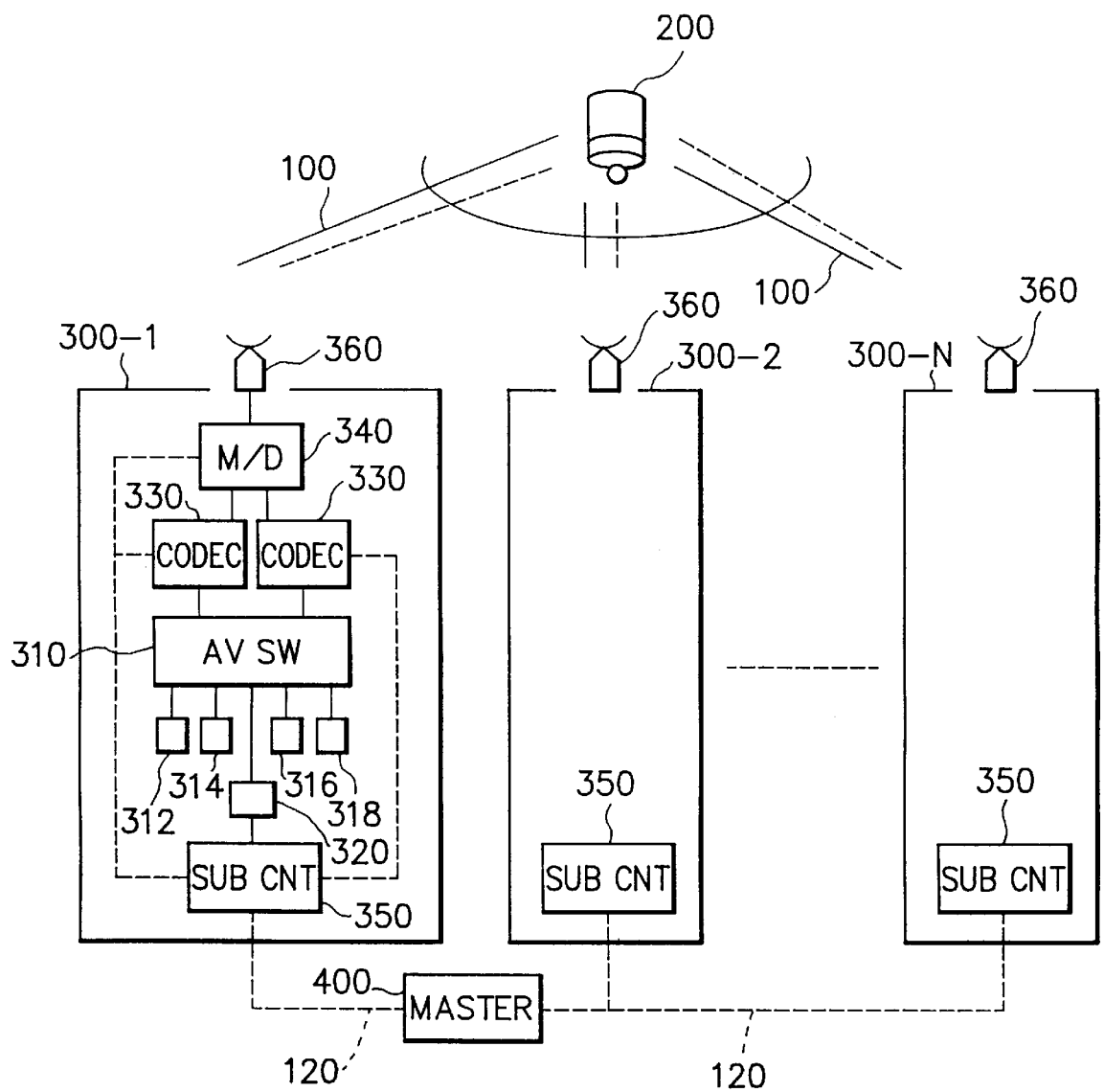
FIG. 1 is a block diagram of a multi-point videoconference system showing the state of art.
Figure 2:
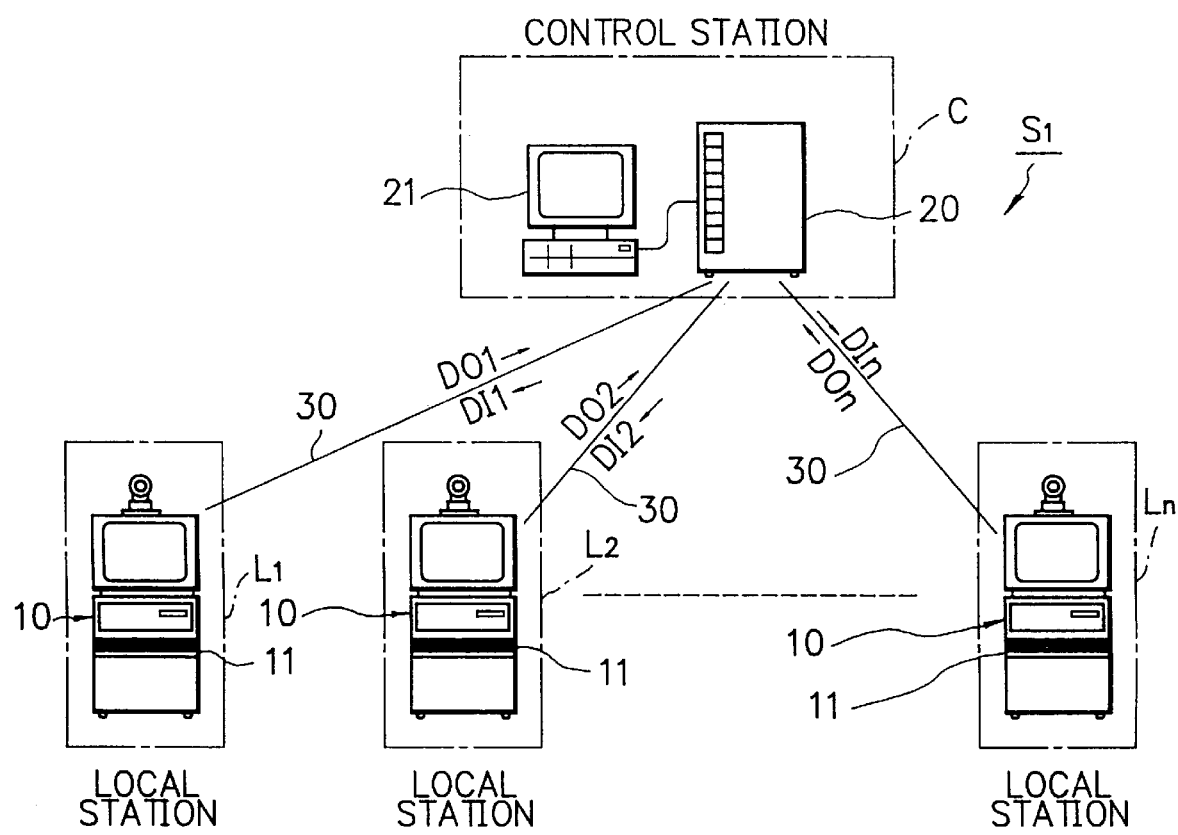
FIG. 2 is a schematic connection diagram of a multi-point videoconference system according to a first embodiment of the invention.

FIG. 2 shows a multi-point digital videoconference system S1 according to a first embodiment of the invention.

The system S1 comprises a plurality of addressed local stations Li (i=1~n), and a control station C connected to the local stations Li in the form of a star connection by using a plurality of communication lines 30. In other words, each local station Li is connected to the control station C by a single communication line 30. Each communication line 30 may be a private digital line or of an ISDN (Integrated Service Digital Network). Each local station Li has its own data consisting of audio data, video and control data. The audio data and the video data may be produced by processing collected audible sounds from and a temporal sequence of caught images of an object or person in the station, respectively, or may be output from a data source such as a tape recorder or a video recorder. The control data are generated in a later-described manner.

Each local station Li has terminal equipment 10 for coding in a compressing manner and multiplexing its data input thereto from peripheral equipment 11 thereof to obtain a first multiplex data DOi (i=1~n) to be output therefrom to the communication line 30, and demultiplexing and decoding in a decompressing manner a second multiplex data DIi (i=1~n) input thereto from the communication line 30 to obtain reproduced data to be output therefrom to the peripheral equipment 11.

Each communication line 30 transmits the first multiplex data DOi output from the terminal equipment 10 of an associated local station Li to the control station C, and the second multiplex data DIi to be input from the control station C to the terminal equipment 10 of the associated station Li.

The control station C has a multi-point videoconference controller (MCU) 20 for responding to the control data in the first multiplex data DOi transmitted thereto through the communication line 30 from any local station Li, to process the first multiplex data DO1 from a selected local station L1 to generate the second multiplex data DIj (j=2~n) to be transmitted through the communication line 30 to each of the local stations Lj (j=2~n) other than the selected station L1, so that this multiplex data DIj includes the audio data and the video data in the first multiplex data DO1 from the selected station Li, as they are coded in the compressing manner and multiplexed. As a result, the audio data and the video data of the selected station L1 is broadcasted to the other local stations Lj. Therefore, the selected station L1 may be provided with a seat for a speaker or lecturer, and the other local stations Lj each may have a number of seats for persons hearing a speech or receiving a lecture.

The second multiplex data DI1 transmitted the selected station L1 is kept alive in a nullified state. The manner of selecting a local station is arbitrary. In the present embodiment, it is programmed in the multi-point videoconference controller 20 which has its own terminal 21 for various purposes including necessary programming as well as data input and output.

The first multiplex data DOi and the second multiplex data DIi are each formatted in a temporal frame having time-divided fields for transmitting the audio data, the video data and the control data, as they are compressedly coded and multiplexed. A system clock is distributed by the frame.

In operation of the system S1, the data originating at each station Li are coded in a compressing manner and multiplexed to obtain the first multiplex data DOi at each local station Li.

Then, the first multiplex data DOi of each local station Li is transmitted through the communication line 30 connecting the local station C to that control station Li.

Then, the videoconference controller 20 responds to the control data in the first multiplex data DOi transmitted through the communication line 30 to the control station C from any local station Li, to process the first multiplex data DO1 from the selected local station L1 to generate the second multiplex data DIj including the audio data and the video data from the selected station L1.

Then, the second multiplex data DIj is transmitted through the communication line 30 to each of the local stations Lj other than the selected station L1.

Then, the second multiplex data Lj is demultiplexed and decoded in a decompressing manner to obtain reproduced data at each of the other local stations Lj.

The local stations Li are identical to each other in constitution.

Figure 3:
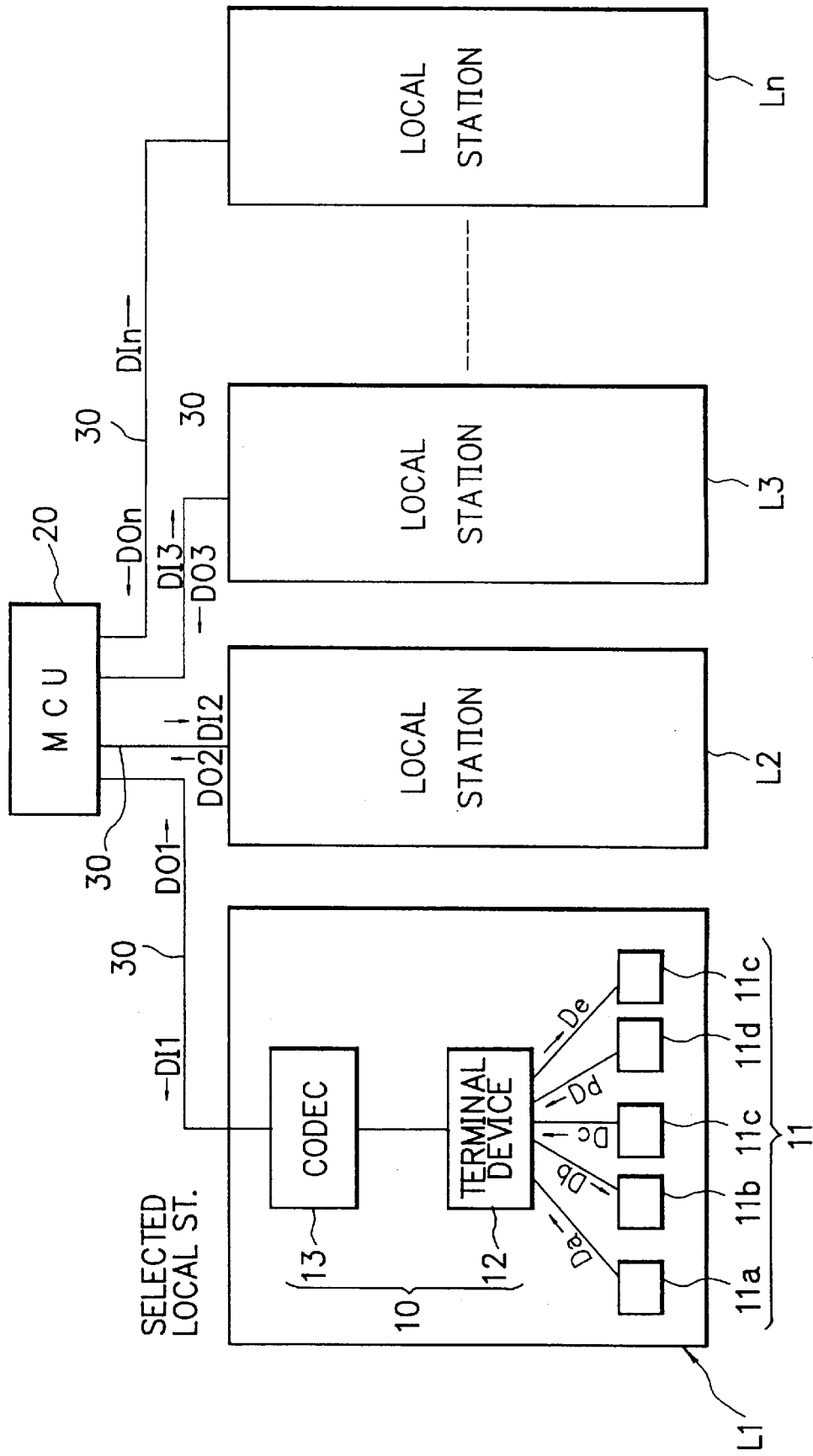
FIG. 3 is a block diagram of the multi-point videoconference system of FIG. 2.

As shown in FIG. 3, each local station Li includes the terminal equipment 10 consisting of a controlling terminal device 12 and a CODEC (coder/decoder) 13 adapted for a multiplexing and a demultiplexing and having the peripheral equipment 11.

The peripheral equipment 11 includes a directional camera 11a of a CCD (charge coupled device) type controllable from the terminal device 12 and hence also from the videoconference controller 20 or from another local station Li to scan an arbitrary region or spot of that station to produce the video data Da, a monitor 11b of a liquid crystal or cathode ray tube type controllable to display reproduced data Db from the video data and information contained in the control data in the second multiplex data DIi, a local controller 11c consisting of a keyboard or touch panel operable to generate the control data Dc and to input necessary data therefor and additional data and instructions thereto, a directional microphone 11d controllable to generate the audio data Dd, and a speaker 11e controllable to output reproduced audio data De from the audio data in the second multiplex data DIi. The monitor 11b is implemented to display in a superimposing manner contained or added information in or to the control data in the second multiplex data DIi.

The terminal device 12 inputs the data originating at the station Li consisting of the audio data Dd, the video data Da and the control data Dc from the periperal equipement 11 to the CODEC 13 and outputs the reproduced audio data De and video data Db from the CODEC 13 to the peripheral equipment 11, conducting signal conversions from analog to digital or vice versa, as necessary.

At the CODEC 13, the data input thereto from the terminal device 12 are coded in a compressing manner and multiplexed to obtain the first demultiplex data DOi to be output to the communication line 30, and the second multiplex data DIi input thereto from the communication line 30 is demultiplexed and decoded in a decompressing manner to obtain the reproduced data including the reproduced audio data De and the reproduced video data Db to be output in a direct or signal converting manner through the terminal device 12 to the peripheral equipment 11.

The videoconference controller 20 is responsive to a request for voice contained in the control data Dc in the first multiplex data DOk (k>1) from an arbitrary station Lk in local stations Lj other than the selected station L1, to process the first multiplex data DOk from the arbitrary station Lk to generate the second multiplex data DO1 to the selected station L1 with the request for voice contained therein.

The videoconference controller 20 is responsive also to a cancel instruction contained in the control data Dc in the first multiplex data DOk from an arbitrary station Lk in local stations Lj other than the selected station L1, to stop responding to the request for voice received from the arbitrary station Lk before receiving the cancel instruction.

The videoconference controller 20 is further responsive to a permission of voice signal to an arbitrary station Lk in local stations Lj other than the selected station L1, when the permission is contained in the control data Dc from the selected station L1, to process the first multiplex data DOI from the selected station L1 to add the permission to the second multiplex data DIk to the arbitrary station Lk, and to process the first multiplex data DOk from the arbitrary station Lk to add the audio data Dd thereof to the second multiplex data DIm (m ≠k) to each Lm of the local stations Li except the arbitrary station Lk.

The videoconference controller 20 is still further responsive to a cancel instruction contained in the control data Dc in the first multiplex data DO1 from the selected station L1, to stop responding to the permission of voice received from the selected station L1 before receiving the cancel instruction.

The videoconference controller 20 is yet further responsive to an addition instruction contained in the first multiplex data DO1 from the selected station L1 to process the first multiplex data DOk of a designated local station Lk by the instruction, to generate the second multiplex data DIm to each Lm of the local stations Li except the designated station Lk, with the audio data Dd and the video data Da of the designated station Lk additionally contained therein.

Moreover, the videoconference controller 20 is responsive to a station select instruction contained in the first multiplex data DO1 from the selected station L1 to select a number of reception stations from among the other local stations Lj in accordance with the select instruction and to generate the second multiplex data to each of the reception stations.

Further, the videoconference controller 20 is responsive to a display instruction contained in the first multiplex data DO1 from the selected station L1 to add a corresponding reproducible display data to the instruction onto the second multiplex data DIi to each local station Li. The display data may be a working state of the system S1.

The second multiplex data DIi to each of other local stations may include part of the control data Dc from selected station L1.

The local controller 11c at each local station Li is operable to generate control data Dc.

The local controller 11c at each of the other stations Lj is operable to provide the control data Dc with a request for voice and to cancel the request, and the local controller 11c at the selected station L1 is operable to provide the control data Dc with a permission to the request for voice and to cancel the permission.

The local controller 11c at the selected station L1 is further operable to provide the control data with an instruction to the videoconference controller 20.

The videoconference controller 20 may be responsive to a voice in the audio data in the first multiplex data DOi from an arbitrary station Li, when the audio data Dd in the first multiplex data DOi from the selected station L1 includes no voice, to process the first multiplex data DOi from the arbitrary station Li to generate the second multiplex data to each of other local stations than the arbitrary station Li, having contained therein the audio data Dd and the video data Da in the first multiplex data DOi from the arbitrary station Li.

Figure 4:
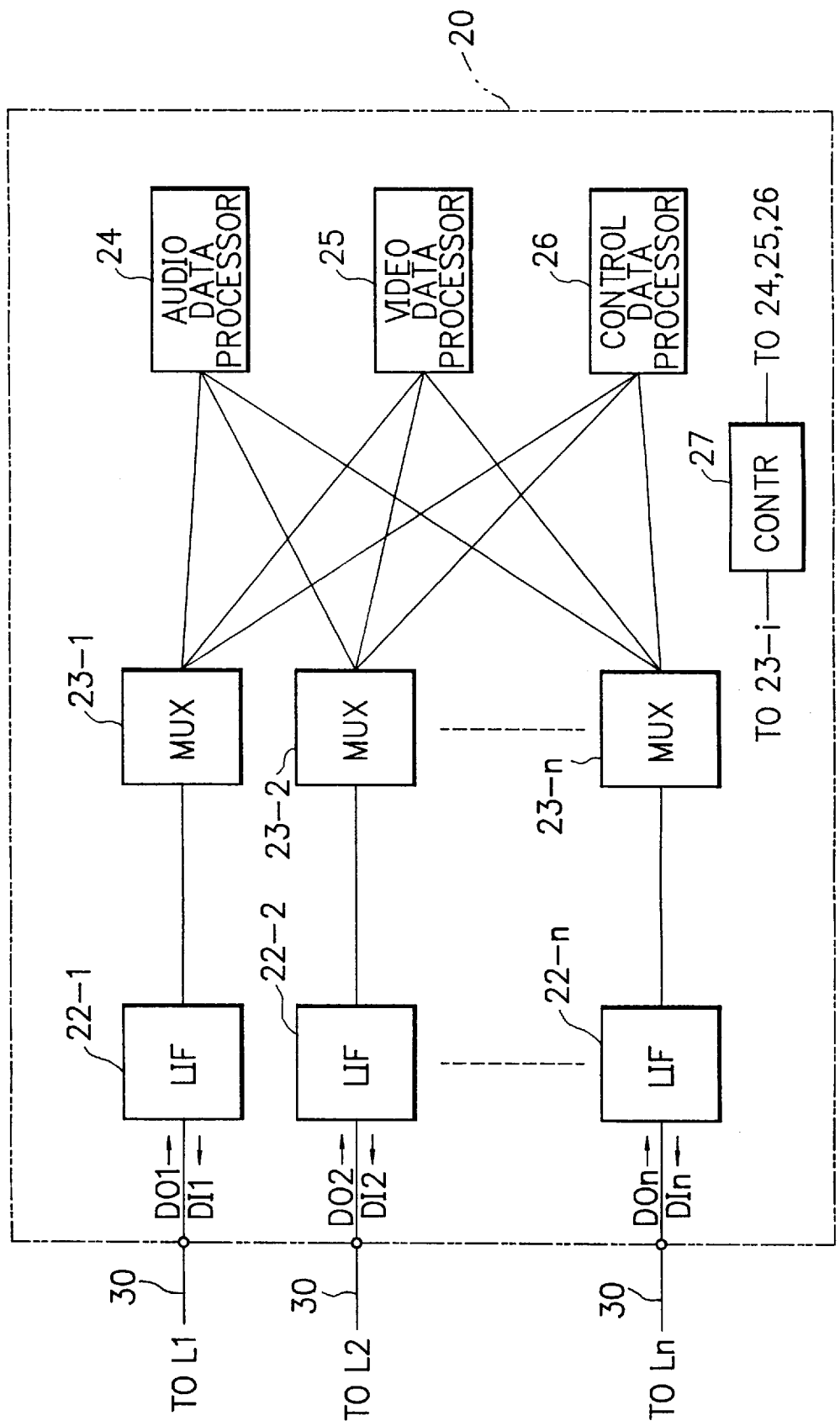
FIG. 4 is a block diagram of a multi-point videoconference controller employed in the multi-point videoconference system of FIG. 2.

As shown in FIG. 4, the multi-point videoconference controller 20 comprises a plurality of line interfaces (LIF) 22-i (i=1~n) each respectively connected to a corresponding one of the communication lines 30, a plurality of multiplexers (MUX) 23-i (i=1~n) each respectively connected to a corresponding one of the line interfaces 22-i, a combination of an audio data processor 24, a video data processor 25 and a control data processor 26 each respectively cross connected to the respective multiplexers 23-i, and an internal controller 27.

Each first multiplex data DOi input to the videoconference controller 20 from the communication line 30 is interfaced by the line interface 22-i to the multiplexer 23-1, where it is decomposed into audio data, video data and control data.

The audio data, video data and control data are then input to the audio data processor 24, the video data processor 25 and the control data processor 26, respectively, where they are processed under control of the controller 27, to have produced audio data, video data and control data in the described manner.

These data are recomposed at the multiplexers 23-i, to be output through the line interfaces 22-i, as the second multiplex data DIi to the communication line 30.

Figure 5:
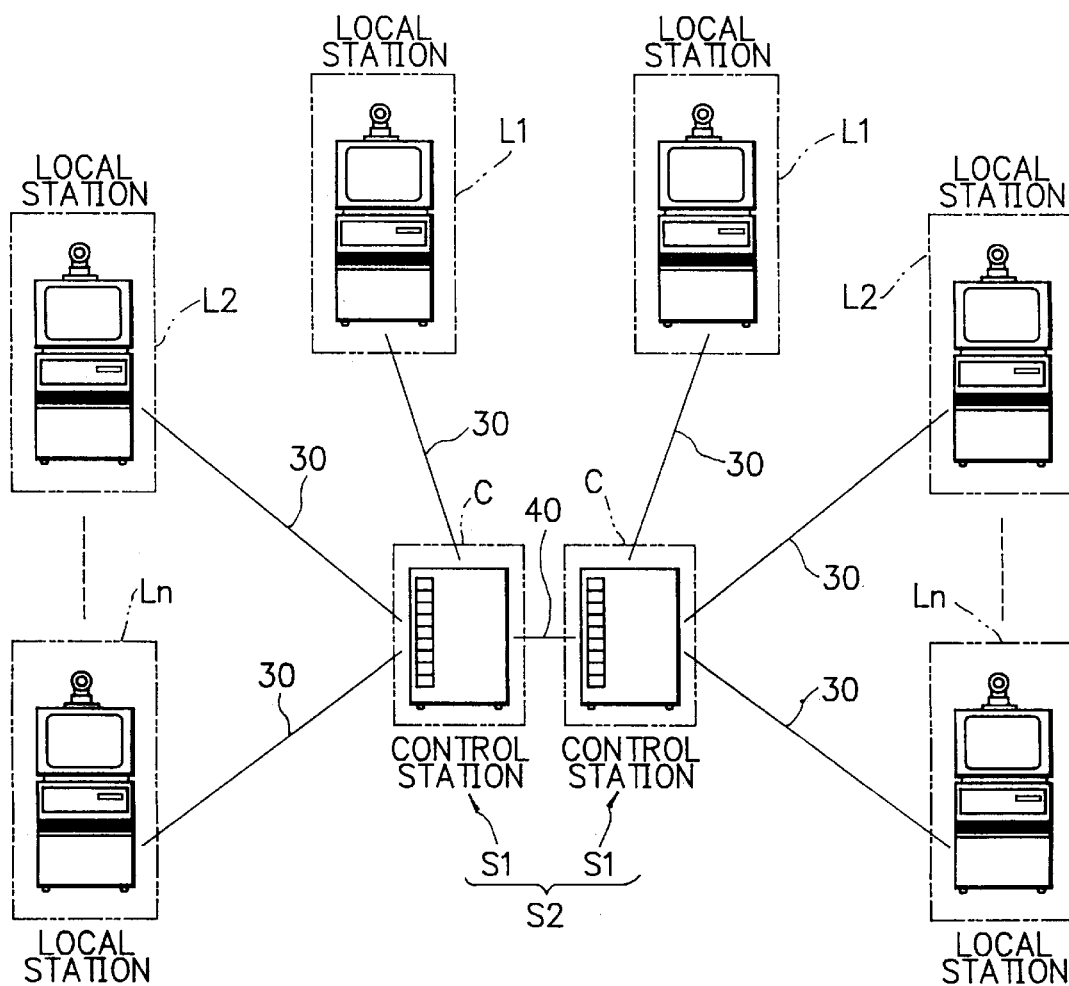
FIG. 5 is a schematic connection diagram of a multi-point videoconference system according to a second embodiment of the invention.

FIG. 5 shows a multi-point vedeoconference system S2 according to a second embodiment of the invention. Like members to the first embodiment are designated at like characters to FIG. 2.

The videoconference system S2 comprises a pair of multi-point videoconference systems S1 cascaded to each other by a communication line 40 interconnecting control stations C and C with each other.

Either control station C serves as a multi-point videoconference control station, and the other control station, as a data repeater, so that either system S1 has a selected local station L1 and the other system S1 does not have a selected station.

Each system S1 may have a selected station L1.

Each local station Li may be selected so that a second multiplex data to each local station Li may have audio data, video data and/or control data from an arbitrary local station Li.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A multi-point videoconference system, comprising:
    a plurality of local stations each producing its own data, said own data including audio data, video data and control data capable of including at least one of a request for voice and a request for video, said local stations each having terminal equipment adapted to at least (i) code in a compressing manner and multiplex said own data to obtain first multiplex data, (ii) output said first multiplex data, and (iii) demultiplex and decode in a decompressing manner second multiplex data input thereto to obtain reproduced data to be presented by said local station;

a control station having a multi-point videoconference controller adapted to (i) respond to said control data of said first multiplex data transmitted thereto from said local stations, (ii) recognize one of said local stations as a selected station, (iii) process said first multiplex data from said selected station to generate said second multiplex data, (iv) transmit said second multiplex data which includes said audio data and said video data of said first multiplex data of said selected station to each of said local stations other than said selected station, (v) process said first multiplex data from an arbitrary one of said local stations, which includes said at least one request, to produce said second multiplex data, including said request, for delivery only to said selected station, and (vi) add at least one of said voice data and said video data of said arbitrary station to said second multiplex data for transmission to said local stations other than said arbitrary station when said selected station grants said request; and a plurality of communication lines interconnecting said control station with said local stations in a one to one corresponding manner for transmitting said first multiplex data and said second multiplex data.

2. The multi-point videoconference system as claimed in claim 1, wherein said multi-point videoconference controller is adapted to respond to a cancel instruction contained in said control data of said first multiplex data from said arbitrary station, by ceasing to respond to said request received from said arbitrary station.

3. The multi-point videoconference system as claimed in claim 1, wherein said multi-point videoconference controller is adapted to respond to a permission of request signal contained in said control data of said selected station which indicates that said request of said arbitrary station is granted.

4. The multi-point videoconference system as claimed in claim 3, wherein said multi-point videoconference controller is adapted to respond to a cancel instruction contained in said control data of said first multiplex data from said selected station by ceasing to respond to said permission of request signal received from said selected station.

5. The multi-point videoconference system as claimed in claim 1, wherein said multi-point videoconference controller is adapted to (i) respond to an addition instruction contained in said first multiplex data from said selected station by processing said first multiplex data of least one of said local stations such that said second multiplex data includes said audio data and said video data of said at least one local station, and (ii) transmit said second multiplex data to each of said local stations except said at least one local station.

6. The multi-point videoconference system as claimed in claim 1, wherein said multi-point videoconference controller is adapted to respond to a station select instruction contained in said first multiplex data from said selected station such that only a number of local stations determined by said select instruction receive said second multiplex data.

7. The multi-point videoconference system as claimed in claim 1, wherein said multi-point videoconference controller is adapted to respond to a display instruction contained in said first multiplex data from said selected station such that corresponding reproducible display data is added to said second multiplex data for display by each of said local stations.

8. The multi-point videoconference system as claimed in claim 1, wherein said terminal equipment at each local station is provided with peripheral equipment including a local controller for generating said control data of each said local station.

9. The multi-point videoconference system as claimed in claim 8, wherein said local controller of each of said other stations is operable to provide said control data with said request and to cancel said request; and said local controller of said selected station is operable to provide said control data with a permission of request signal granting said request and to cancel said permission of request signal.

10. The multi-point videoconference system as claimed in claim 8, wherein said local controller of said selected station is operable to provide said control data with an instruction to said multi-point videoconference controller.

11. The multi-point videoconference system as claimed in claim 1, wherein said multi-point videoconference controller is adapted to (i) respond to a voice signal in said audio data in said first multiplex data from an arbitrary station of said local stations when said audio data in said first multiplex data from said selected station includes no voice data, (ii) process said first multiplex data from said arbitrary station to generate said second multiplex data which includes at least said audio data of said first multiplex data from said arbitrary station, and (iii) transmit said second multiplex data to said local stations other than said arbitrary station.

12. The multi-point videoconference system as claimed in claim 1, wherein said selected station is programmed in said multi-point videoconference controller.

13. A multi-point videoconference method for a system including a control station and a plurality of local stations each having its own data comprising audio data, video data and control data capable of including at least one of a request for voice and a request for video, the method comprising the steps of:

establishing a selected local station;

coding in a compressing manner and multiplexing said own data to obtain first multiplex data at each local station;

transmitting said first multiplex data of each local station through a communication line connecting said local station to said control station;

responding, at the control station, to said control data in said first multiplex data from any local station by processing said first multiplex data from said selected local station to generate second multiplex data which includes said audio data and said video data from said selected station;

transmitting said second multiplex data from said control station through said communication line to each of said local stations other than said selected station;

demultiplexing and decoding in a decompressing manner the second multiplex data to obtain reproduced data at each of said other local stations;

responding to an arbitrary one of said local stations, which includes said at least one request, by producing said second multiplex data including said request and delivering said data only to said selected station; and adding said first multiplex data of said arbitrary station to said second multiplex data for transmission to said local stations other than said arbitrary station when said selected station grants said request.

* * * * *